(12) United States Patent
Zarar et al.

(10) Patent No.: US 11,526,581 B2
(45) Date of Patent: Dec. 13, 2022

(54) COMPRESSION-ENCODING SCHEDULED INPUTS FOR MATRIX COMPUTATIONS

(71) Applicant: Microsoft Technology Licensing, LLC, Redmond, WA (US)

(72) Inventors: Shuayb M. Zarar, Redmond, WA (US); Amol Ashok Ambardekar, Redmond, WA (US); Jun Zhang, New York, NY (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 90 days.

(21) Appl. No.: 17/085,337

(22) Filed: Oct. 30, 2020

(65) Prior Publication Data

US 2021/0049232 A1 Feb. 18, 2021

Related U.S. Application Data

(63) Continuation of application No. 16/261,199, filed on Jan. 29, 2019, now Pat. No. 10,846,363.

(60) Provisional application No. 62/769,488, filed on Nov. 19, 2018.

(51) Int. Cl.
*G06F 17/16* (2006.01)
(52) U.S. Cl.
CPC .................................. *G06F 17/16* (2013.01)
(58) Field of Classification Search
CPC . G06F 17/16; G06F 12/0207; G06F 2212/454
See application file for complete search history.

(56) References Cited

U.S. PATENT DOCUMENTS

| 9,485,326 | B1 | 11/2016 | Ulman et al. |
| 2006/0112255 | A1 | 5/2006 | Sprangle et al. |
| 2013/0304988 | A1 | 11/2013 | Totolos et al. |
| 2014/0101381 | A1 | 4/2014 | Svendsen |
| 2014/0129757 | A1 | 5/2014 | Lo et al. |
| 2014/0298056 | A1 | 10/2014 | Seki et al. |

(Continued)

OTHER PUBLICATIONS

"Final Office Action Issued in U.S. Appl. No. 16/355,086", dated Jan. 15, 2021, 33 Pages.

(Continued)

*Primary Examiner* — Matthew D Sandifer
(74) *Attorney, Agent, or Firm* — Alleman Hall Creasman & Tuttle LLP

(57) ABSTRACT

A method of performing matrix computations includes receiving a compression-encoded matrix including a plurality of rows. Each row of the compression-encoded matrix has a plurality of defined element values and, for each such defined element value, a schedule tag indicating a schedule for using the defined element value in a scheduled matrix computation. The method further includes loading the plurality of rows of the compression-encoded matrix into a corresponding plurality of work memory banks, and providing decoded input data to a matrix computation module configured for performing the scheduled matrix computation. For each work memory bank, a next defined element value and a corresponding schedule tag are read. If the schedule tag meets a scheduling condition, the next defined element value is provided to the matrix computation module. Otherwise, a default element value is provided to the matrix computation module.

20 Claims, 7 Drawing Sheets

(56) References Cited

U.S. PATENT DOCUMENTS

2015/0242484 A1    8/2015  Zhao et al.
2017/0206031 A1    7/2017  Yin
2019/0115933 A1*   4/2019  Chen .................. G06N 3/04

OTHER PUBLICATIONS

"Final Office Action Issued in U.S. Appl. No. 16/355,086", dated Dec. 3, 2021, 29 Pages.
"Non Final Office Action Issued in U.S. Appl. No. 16/355,086", dated Jul. 14, 2021, 32 Pages.
"Non Final Office Action Issued in U.S. Appl. No. 16/355,086", dated Sep. 9, 2020, 29 Pages.
"Notice of Allowance Issued in U.S. Appl. No. 16/355,086", dated Jun. 17, 2022, 8 Pages.

* cited by examiner

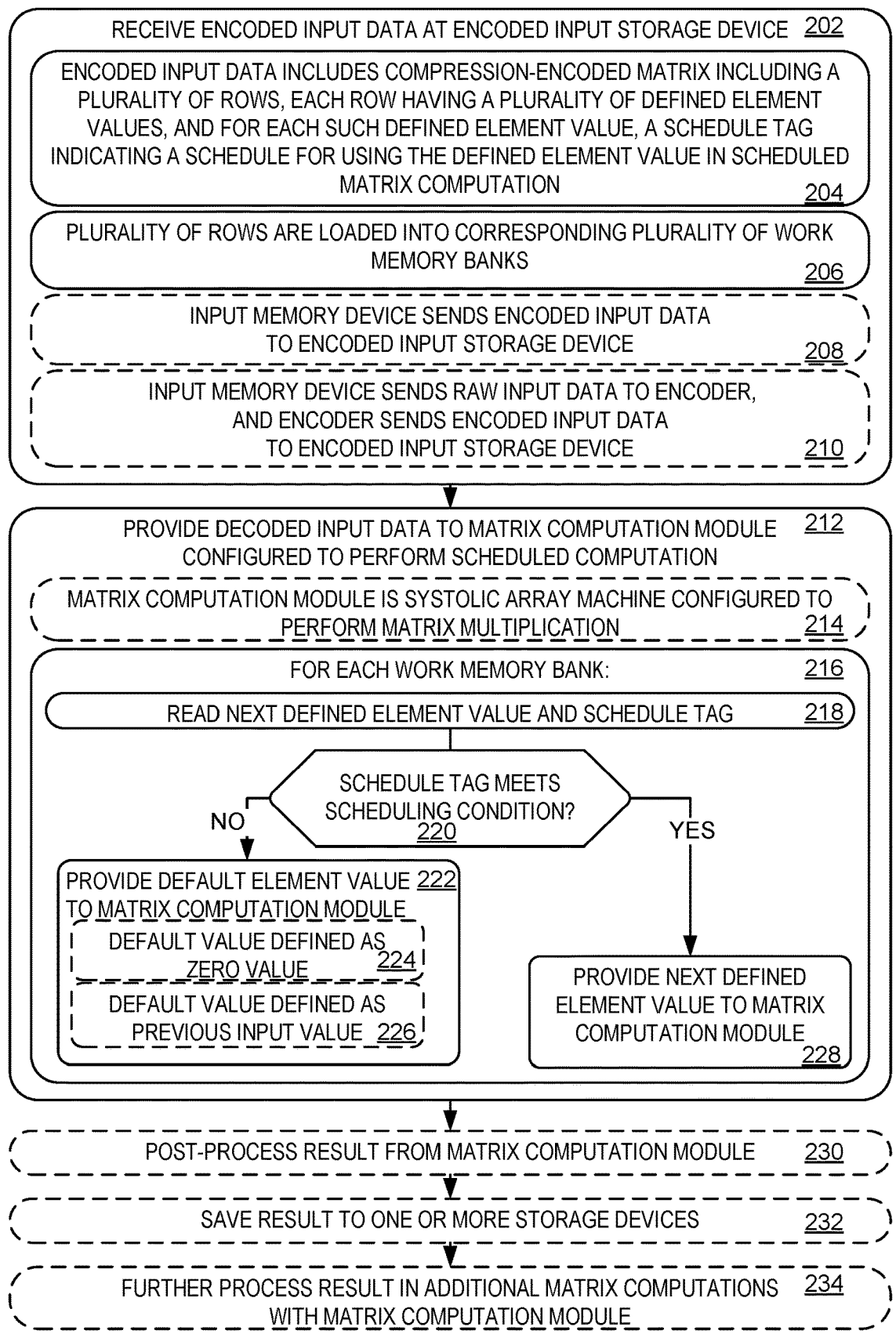

FIG. 5A
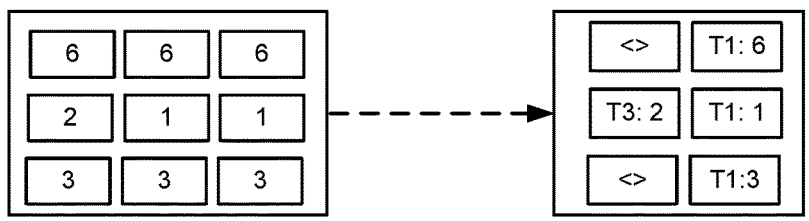
FIG. 5B  FIG. 5C  FIG. 5D
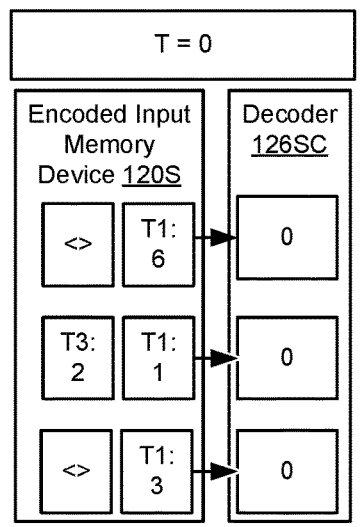 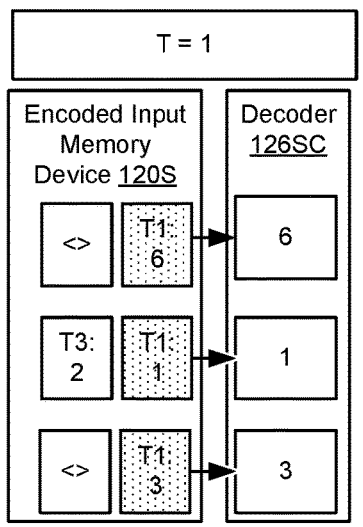 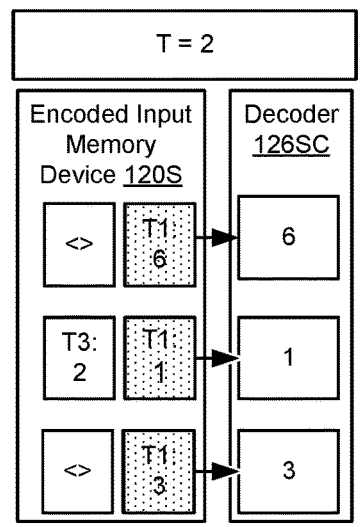
FIG. 5E  FIG. 5F
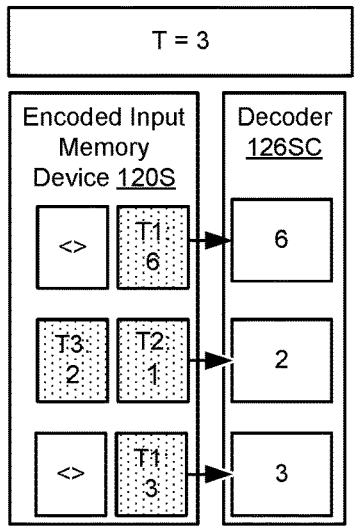 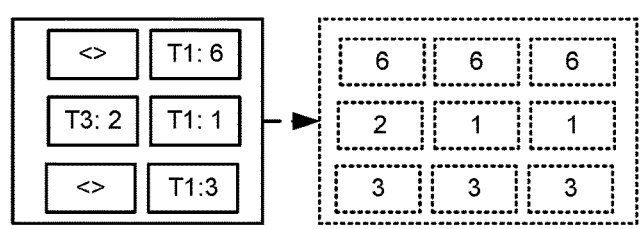

COMPRESSION-ENCODING SCHEDULED INPUTS FOR MATRIX COMPUTATIONS

CROSS REFERENCE TO RELATED APPLICATIONS

This application is a continuation from U.S. patent application Ser. No. 16/261,199, filed Jan. 29, 2019, which claims priority to U.S. Provisional Patent Application Ser. No. 62/769,488, filed Nov. 19, 2018, the entirety of each of which is hereby incorporated herein by reference for all purposes.

BACKGROUND

Computer programs for technologies including artificial intelligence, graphics, and scientific research can often be implemented in an efficient manner by using matrix calculations such as matrix multiplications. However, matrix computations typically involve large memory and power consumption.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method of performing matrix computations includes receiving a compression-encoded matrix including a plurality of rows. Each row of the compression-encoded matrix has a plurality of defined element values and, for each such defined element value, a schedule tag indicating a schedule for using the defined element value in a scheduled matrix computation. The method further includes loading the plurality of rows of the compression-encoded matrix into a corresponding plurality of work memory banks, and providing decoded input data to a matrix computation module configured for performing the scheduled matrix computation. For each work memory bank, a next defined element value and a corresponding schedule tag are read. If the schedule tag meets a scheduling condition, the next defined element value is provided to the matrix computation module. Otherwise, a default element value is provided to the matrix computation module.

BRIEF DESCRIPTION OF THE DRAWINGS

FIG. 2 shows a method of providing input data for a scheduled computation, based on compression-encoded input data.

FIG. 5A shows an exemplary transition encoding of an input data matrix.

FIGS. 5B-5F show the provision of data values from the transition-encoded input matrix in a scheduled computation.

DETAILED DESCRIPTION

Figure 1A:
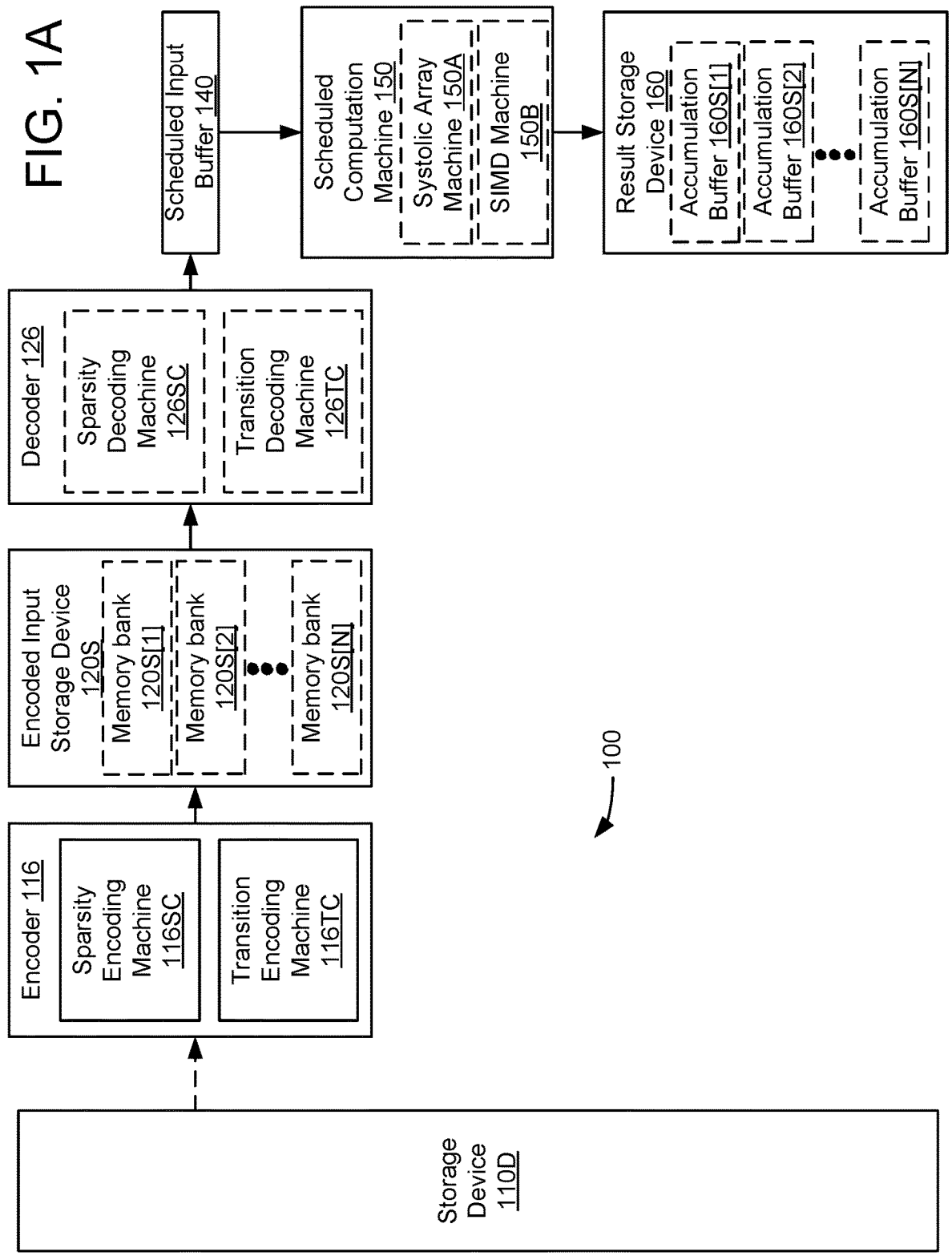
FIGS. 1A-1B show an exemplary architecture for performing scheduled computations.

Computer programs for technologies including artificial intelligence, graphics, and scientific research can often be implemented efficiently using matrix calculations such as matrix multiplication. Non-limiting examples of computer programs that can be substantially implemented using matrix calculations include graphics processing programs (e.g., rendering software), artificial intelligence models, such as: deep neural networks (DNN), convolutional neural networks (CNN; e.g. Deep Convolutional Neural Networks (DCNN)), recurrent neural networks (RNN; e.g., long short-term memory (LSTM)), among many other artificial intelligence models. These artificial intelligence models can be implemented using multiple layers of matrix calculations that start with an input vector and process the input vector at each layer of matrix calculation to calculate arbitrary functions, e.g., functions learned using machine learning training algorithms. Deep learning has achieved state-of-the-art results in many applications such as computer vision, machine translation, voice assistance, etc. As one example of an artificial intelligence model that can be substantially implemented using matrix computations, Convolutional Neural Networks (CNNs) typically include multiple layers that can be mathematically decomposed as massive matrix multiplications (convolutions), followed by elementwise non-linear transformations such as sigmoid or rectified linear unit (ReLU).

However, matrix computations typically involve large computational runtime cost, memory and power consumption. For example, a CNN for processing image data (e.g., photographic data, video data, and the like) may perform many hundreds or thousands of arithmetic operations just to process a single image. As another example, existing DNNs can have more than 100 layers, where processing each layer includes performing many hundreds or even thousands of arithmetic operations.

Runtime cost, memory, and power consumption of matrix computations may potentially be reduced using specialized hardware. Specialized hardware may substantially reduce these costs relative to sequential computations, e.g., matrix computations using conventional, general-purpose computing hardware.

For example, matrix computations may be implemented substantially in parallel to reduce runtime cost. Parallelized matrix implementations may perform steps of a matrix computation in a scheduled fashion to achieve efficient data flow throughout the computation. For example, an efficient parallel implementation may ensure that input data are accessed from memory in an optimal order when needed and solving sub-problems of a matrix computation to exploit spatial and/or temporal locality, reducing memory accesses and computational latency. The scheduled matrix computation may require data to be provided according to a fixed schedule, e.g., by loading the data into a scheduled input buffer configured to provide data items to the computation in synchronization with a clock of the matrix computation hardware. Parallelized matrix computation implementations may be implemented using various concurrent and/or parallel hardware, e.g., systolic arrays and single-input, multiple data processors (e.g., vector processors, such as INTEL MMX™-capable processors). For example, systolic arrays may be used to accelerate large DNNs to achieve high throughput and high energy-efficiency.

A non-limiting example of specialized hardware for matrix computation is a systolic array (SA) for matrix multiplications. A systolic array for matrix multiplications can be implemented as a plurality of tightly-coupled 2D Multiply-Accumulate (MAC) computational nodes that are highly synchronized to process data as it arrives in the systolic array in synchronization with a schedule (e.g., a clock). The matrix multiplication may be decomposed into local operations for computing portions of the matrix multiplication product. The matrix multiplication may be decomposed in any suitable fashion, e.g., by computing block portions of the matrix, successive diagonals of the matrix, etc.

Accordingly, in a SA for matrix multiplications, 2D MAC computational nodes may be configured to perform a matrix multiplication decomposed into local operations, using only nearest-neighbor communications between MAC computational nodes. The local operations are computed using only the input data and/or intermediate calculated values that are required for the local operation. Accordingly, the SA for matrix multiplications may reduce (e.g., minimize) memory access latencies and power consumption. For example, wires between non-local computational nodes may represent a large potential power cost. By exclusively using local connections, SA for matrix multiplications may substantially reduce power consumption relative to sequential matrix computations.

In addition to matrix multiplications, systolic arrays, SIMD processors, and other specialized hardware may be used to perform a wide variety of other matrix computations. Non-limiting examples of matrix computations which may be implemented at least partially as scheduled computations using specialized hardware include principle component analysis (PCA), Fourier transform, matrix addition and subtraction, and the like. Furthermore, matrix computations as described herein may also refer to generalized tensor computations (e.g., vector computations and higher tensor computations) which may be similarly implemented using specialized hardware for performing scheduled computations. For example, non-limiting examples of vector/matrix/tensor computations that may be implemented efficiently using the techniques of the present disclosure include pooling operations (e.g., max pooling), Hadamard product operations, etc.

Returning to the example of matrix multiplication, typical systolic arrays are designed for dense matrix multiplication. "Dense matrix" is used herein to refer to matrices in which all elements are explicitly defined, including elements with zero values. Dense matrices typically have a memory consumption for storage that depends on the size of the matrix dimensions (e.g., 2×2, 3×3, etc.), since every element of the matrix is explicitly defined and stored. Storing and computing with dense matrices may be particularly efficient when the matrices include relatively few zero elements.

Matrices can alternately be stored as "sparse matrices," used herein to refer to matrices in which only non-zero elements are explicitly defined. Storing and computing with sparse matrices may be particularly efficient when there are relatively few non-zero entries, because only the non-zero entries are explicitly defined. Accordingly, only the non-zero elements need to be stored, and in some cases, computations may be simplified or optimized based on the implicit encoding of the zero-valued elements (e.g., skipping a portion of a computation corresponding to computing the product of one or more values including one of the implicitly-encoded zero values).

Inputs to matrix computations often include many zero-valued elements. For example, due to ReLU activation and quantization, the inputs to each layer of a DNN typically include many zero-valued elements.

Accordingly, in order to exploit the sparsity in the inputs, the present disclosure describes a sparsity encoder and decoder to compress the data used during a scheduled matrix computation. For example, the sparsity-encoded data can be stored in a compressed form in an input buffer for specialized hardware for performing matrix computations—e.g., static random-access memory (SRAM). According to the methods disclosed herein, access to the input buffer can be reduced, therefore conserving energy (e.g., energy associated with repeated SRAM reads).

The present disclosure describes how the sparsity encoder and decoder can be extended to a more general compression encoder and decoder configured to use different compression-encoding schemes including sparsity encoding and transition encoding. The present disclosure describes how the compression encoder and decoder can utilize a sparsity-encoding scheme to exploit sparsity in input matrices, as well a transition-encoding scheme to exploit redundancy and similarity in input matrices.

The techniques described herein may be generally applied to any matrix computation hardware which receives input data in a synchronous, scheduled fashion, e.g., any matrix computation which receives scheduled data in order via an input buffer (e.g., a first-in, first-out (FIFO) queue). For example, systolic arrays for matrix multiplication may process input operand matrices in a scheduled fashion based on input operand matrix elements being enqueued in a scheduled input buffer.

It will be understood that use of the herein-described sparsity encoder and decoder can achieve energy savings regardless of the type of storage technology used. Though the present disclosure primarily describes accessing sparse inputs from SRAM, other suitable storage may additionally or alternatively be used. Similarly, the energy savings can be achieved without the use of a systolic array, and in alternative implementations can be combined with other computing paradigms such as SIMD (Single Instruction Multiple Data). The computer system described herein works directly on the encoded/compressed data and therefore allows for smaller memory (e.g., SRAM) sizes to be used.

Embedded hardware is in general limited in memory (e.g., SRAM) size. In some examples, a portion of the input data cannot fit into the on-chip primary memory for specialized matrix computation hardware (e.g., on-chip SRAM for a SA for matrix multiplication). Accordingly, this portion of the input data may be stored in a secondary memory. For example, the secondary memory may be an off-chip or otherwise more spatially distant memory, as compared to the on-chip primary memory (e.g., SRAM). The secondary memory may be slower and/or consume more power than the primary memory. Accordingly, the energy associated with accessing the secondary memory may be orders of magnitude higher than the energy costs associated with the primary memory. Accordingly, the herein-proposed design achieves further energy savings by reducing access to the secondary memory, and therefore reducing the energy spent reading data from the secondary memory.

FIG. 1A shows an exemplary computer system 100. System 100 is configured to use specialized hardware to perform scheduled matrix computations as described above with regard to matrix multiplication and other examples. Data-flow in computer system 100 is generally indicated by arrows. Computer system 100 includes a storage device 110D configured to hold data, e.g., raw input data such as input matrix operands for a matrix computation, and/or compression-encoded input data for provision in a scheduled matrix computation. Computer system 100 further includes an encoded input storage device 120S configured to hold compression-encoded input data for scheduled computations according to the present disclosure. In some examples, encoded input storage device 120S may be an on-chip, primary storage device (e.g., SRAM) while storage device 110D may be a slower (e.g., off-chip) secondary storage device (e.g., DRAM).

Optionally, in some examples, encoded input storage device 120S includes a plurality of memory banks (e.g., memory bank 120S[1], memory bank 120S[2], etc., through memory bank 120S[N] for N memory banks in total). For example, encoded input storage device 120S may be configured for efficient concurrent access to the N different memory banks so that each memory bank can be independently accessed without incurring a delay due to other memory bank accesses.

Computer system 100 further includes an encoder 116 configured to compression-encode raw input data (e.g., raw input data received from storage device 110D) for storage in the encoded input storage device 120S. Encoder 116 may use any suitable compression-encoding scheme, e.g., encoder 116 may be implemented as a sparsity-encoding machine 116SC and/or a transition-encoding machine 116TC. Sparsity encoding and transition encoding will be described further below with reference to FIGS. 2, 3, 4A-4F and 5A-5F. In either case, encoder 116 is configured to encode raw input data in a compressed form that takes advantage of sparsity or redundancy in the input data, to permit efficient storage on encoded input storage device 120S (e.g., reducing total memory requirements for storage). The compression-encoded matrix may be sparsity-encoded or transition-encoded as will be described below.

Whether sparsity- or transition-encoded, the compression-encoded matrix represents explicitly defined values for a scheduled matrix computation, along with data needed to provide the values at the proper schedule. Accordingly, a compression-encoded matrix may be defined as a plurality of rows, each row having a plurality of defined element values and, for each such defined element value, a schedule tag indicating a schedule for using the defined element value in a scheduled matrix computation. The word "row" may be used herein to refer to any sequence of data values, e.g., a matrix row or column, a vector, an array, etc.

Examples of compression-encoded matrices are shown in FIGS. 4A-4F (showing sparsity-encoded matrices) and 5A-5F (showing transition-encoded matrices). In some examples, encoded input storage device 120S is configured to receive a compression-encoded matrix including a plurality of rows, and to load each row the plurality of rows of the compression-encoded matrix into a corresponding work memory bank of the plurality of memory banks. In some examples, memory banks of the plurality of memory banks may be switched into power modes including one or more of an active mode, a reduced-power snooze mode, and a reduced-power deep-sleep mode. In some examples, the snooze mode may incur substantially reduced power costs during sustained operation relative to the active mode, and the deep-sleep mode may incur even further reduced power costs relative to the snooze mode.

Computer system 100 further includes a decoder 126 configured to receive compression-encoded data from encoded input storage device 120S (e.g., from one or more memory banks of encoded input storage device 120S), and to decode the compression-encoded data to provide data in a scheduled input buffer 140 for a scheduled computation machine 150. Decoder 126 is configured to provide decoded data directly into the scheduled input buffer 140 as the decoded data is needed, without needing to explicitly store all of the decoded data into memory. Because the stream of data is generated and utilized as data is consumed in the scheduled input buffer 140, there is no need to actually store the data in any one storage device. Accordingly, decoder 126 is able to provide a stream of data that may be substantially larger than memory resources used during a computation. In other words, by using decoder 126, a large stream of data may be processed without incurring a large memory requirement to store the stream of data. Decoder 126 may include a sparsity decoding machine 126SC and/or a transition decoding machine 126TC, so as to decode sparsity-encoded and/or transition-encoded data, as will be described below with regard to FIGS. 2, 3, 4A-4F, and 5A-5F. In some examples, decoder 126 is implemented as a switchable decoder configured for both sparsity decoding and transition decoding, thereby implementing sparsity decoding machine 126SC and transition decoding machine 126TC using common logic.

Providing decoded input data by decoder 126 may result in a stream of data values that would hypothetically occupy a larger space than the compression-encoded data occupies in encoded input storage device 120S, e.g., due to the memory savings from compression in the compression-encoded format. However, the decoded input data is provided into the scheduled input buffer 140 only as it is needed, so that the total memory requirements for a scheduled matrix computation may be kept constant and/or relatively small (e.g., limited to the size of the scheduled input buffer 140). Scheduled input buffer 140 may be implemented via any suitable computer memory, e.g., shift registers or SRAM. Scheduled input buffer 140 may include one or more concurrent buffers, e.g., for providing multiple concurrent streams of scheduled input data to scheduled computation machine 150.

In one example, the scheduled matrix computation is a matrix multiplication computation to compute a matrix product of two compression-encoded matrices. Accordingly, scheduled computation machine 150 may include a systolic array module 150A configured to perform the scheduled matrix computation via a plurality of multiply-and-accumulate computational nodes. Alternately, scheduled computation machine 150 may include a single-instruction, multiple-data computational module (e.g., for performing the matrix multiplication or any other suitable matrix computation).

In some examples, decoder 126 may be configured to operate concurrently on each of the work memory banks of encoded input storage device 120S. For each work memory bank, decoder 126 is configured to provide a stream of scheduled input values. In an example, providing a next input value includes reading a next defined element value and a corresponding schedule tag, then, responsive to the corresponding schedule tag meeting a scheduling condition, providing the next defined element value to the matrix computation module. Responsive to the corresponding schedule tag not meeting the scheduling condition, decoder 126 instead provides a default element value to the matrix computation module (e.g., a zero). In this manner, and as will be shown in further detail below, decoder 126 may automatically provide the default values for the compression-encoding scheme, so such default values need not be defined and stored in the compression domain. Decoder 126 provides the default values whenever no explicitly-defined value is scheduled, and then provides the explicitly-defined values at the correct time in the schedule according to the scheduling information stored in the compression-encoded matrix.

Scheduled computation machine 150 may be any suitable machine that processes data in a scheduled fashion (e.g., streaming data, or multiple concurrent streams of data, provided in scheduled input buffer 140). For example, the data in scheduled input buffer 140 may represent weights and/or input values for a neural network computation. For example, scheduled computation machine 150 may include a systolic array machine 150A. Alternately or additionally, scheduled computation machine 150 may include a SIMD machine 150B. In either case, scheduled computation machine 150 is configured to process data from the scheduled input data from scheduled input buffer 140 and to output result data into a result storage device 160. For example, result storage device 160 may comprise one or more accumulation buffers (e.g., accumulation buffers 160S[1], 160S[2], etc., through 160S[N]) configured to concurrently receive result values as they are output by scheduled computation machine 150. In an example, scheduled computation machine 150 is a systolic array for matrix multiplication, configured to output a matrix product into result storage device 160.

Figure 1B:
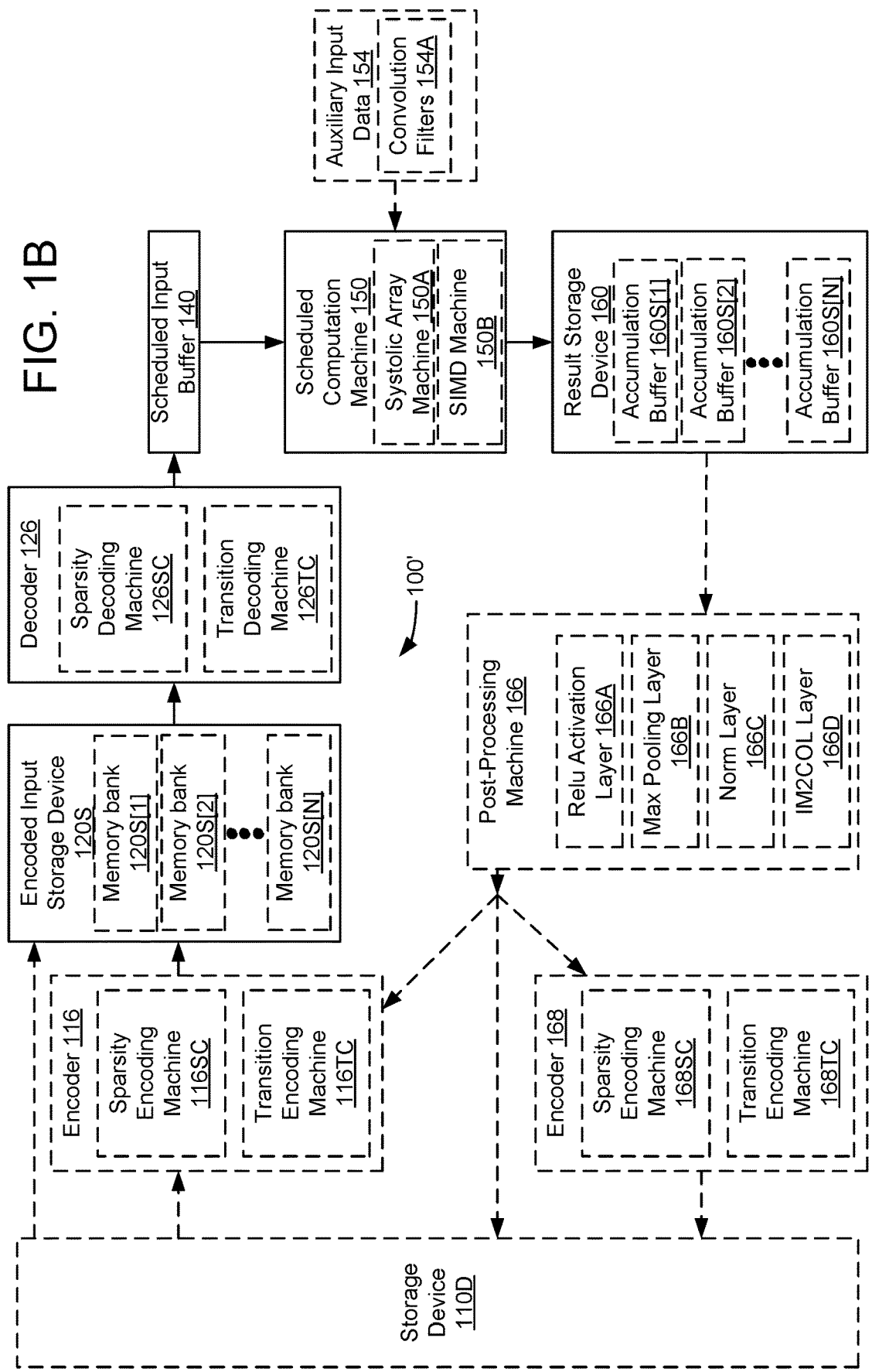

Computer system 100 may be extended to utilize the system for scheduled computations using compression-encoded data in a larger computational pipeline. FIG. 1B schematically illustrates an example architecture 100' usable to implement a deep convolutional neural network (DCNN) while achieving energy savings via the disclosed sparsity encoder and decoder. The scheduled matrix computations performed by the pipeline define layers of the DCNN computation. Although the present disclosure is described with regard to a DCNN pipeline, architecture 100' may be used to implement any suitable artificial intelligence, graphics processing, scientific calculation, or other computational pipeline that may be substantially implemented using matrix computations, e.g., matrix multiplications.

Raw input data for the DCNN may be fetched from storage device 110D (e.g., from DRAM) and compression encoded using encoder 116, as will be discussed in more detail below. Raw input data stored on storage device 110D may include any suitable input data for the DCNN. Non-limiting examples of input data include input image data, audio, word representations, video, matrices, vectors, image inputs converted into column vectors using IM2COL, outputs of intermediate neural network layers, etc.

Alternately or additionally, input data for the DCNN may be stored in compression-encoded form, e.g., in storage device 110D or in encoded input storage device 120S. The encoded input is eventually stored in encoded input storage device 120S and provided, via decoder 126, to scheduled input buffer 140 for a scheduled computation machine 150.

In an example, scheduled computation machine 150 may be configured to perform matrix multiplications for calculating outputs of DCNN layers. Accordingly, scheduled computation machine 150 may utilize auxiliary input data 154 for the DCNN calculations, e.g., convolution filters 154A for computing convolution products between layers of the DCNN. The resulting convolution product matrix for each layer of convolutions may be stored as a result matrix (e.g., as a dense matrix) in result storage device 160.

Results generated by scheduled computation machine 150 may be further processed by a post-processing machine 166. For example, post-processing machine 166 may be configured to perform element-wise processing of matrix elements in the result matrix, such as rectified linear unit (ReLU) activation layer 166A. The stored results may be processed using any other suitable machine learning techniques, e.g., max pooling layer 166B, norm layer 166C, and/or IM2COL layer 166D for re-arranging image blocks into column vectors. Accordingly, results output by post-processing machine 166 may represent results for a single layer of DCNN computation, e.g., a convolution and pooling layer.

Results from post-processing machine 166 may be stored and/or further processed. For example, results from post-processing machine 166 may be sent to an encoder 168 configured to compression-encode the results for storage on storage device 110D. Alternately or additionally, the results may be sent directly to storage device 110D for storage in raw, dense matrix form. Alternately or additionally, the results may be sent to encoder 116 for encoding and storage at encoded input storage device 120S for further processing, e.g., in further layers of DCNN computation. Accordingly, by passing data through the data-flow loop shown in computer system 100', the DCNN pipeline may be implemented with data being substantially held only in the compression-encoded form, resulting in potentially substantial savings in the total memory residency requirements (and corresponding power cost) for the DCNN pipeline.

In some examples, encoder 116 and encoder 168 may be a single encoder configured for encoding data routed from post-processing machine 166 to either storage device 110D or encoded input storage device 120S, or from storage device 110 to encoded input storage device 120S. In other examples, the two encoders can be implemented as separate devices as shown. Separate encoders 116 and 168 may enable the pipelined encoding of data to be processed in computation machine 150, simultaneous with encoding of results from a previous round of computation. Encoder 168 may be substantially same as encoder 116. When encoder 116 and/or decoder 126 are configured to use a fixed choice of compression-encoding scheme (e.g., a fixed choice of either sparsity encoding or transition encoding), encoder 168 may be configured to use the same fixed choice, e.g., so that the whole architecture 100' uses the same fixed choice of compression-encoding scheme.

FIG. 2 shows an exemplary method 200 for providing data to a scheduled matrix computation module in a pipeline, e.g., as implemented by computer system 100 or architecture 100'. Method 200 implements a computation on a compression-encoded matrix without storing a dense, explicitly-defined copy of the matrix in memory during the computation. Accordingly, method 200 may be used to achieve reduced memory residency during the computation, e.g., to reduce SRAM residency and corresponding power cost in a DCNN computation. Method 200 may be used to implement decoders for providing scheduled inputs based on compression-encoded matrices, e.g., decoder 126.

Method 200 includes, at 202, receiving encoded input data at an encoded input storage device. As described at 204, the encoded input data includes a compression-encoded matrix. The compression-encoded matrix includes a plurality of rows. Each row of the compression-encoded matrix has a plurality of defined element values. For each such defined element value, a corresponding schedule tag indicates a schedule for using the defined element value in a scheduled matrix computation. Examples of compression-encoded matrices including defined element values and corresponding schedule tags will be shown with reference to FIGS. 4A-4F (which show sparsity encoding) and FIGS. 5A-5F (which shown transition encoding). As shown at 206, the plurality of rows may be loaded into a corresponding plurality of work memory banks of the encoded input storage device. The input data may be received from an input memory device, e.g., an off-chip, secondary memory device. Optionally, as shown at 208, the input memory device may store encoded input data directly and send the encoded input data to the encoded input storage device. Alternately or additionally, as shown at 210, the input memory device may send raw input data to the encoder to be encoded and sent, by the encoder, to the encoded input storage device. In any event, the encoded input storage device is configured to receive the encoded input data and hold it for provision in a scheduled matrix computation by providing it to a matrix computation module (e.g., via a scheduled input buffer).

In some examples, the input memory device may be an on-chip primary storage device that provides sufficient storage space to store an entire compression-encoded matrix. In other examples, the input memory device may be an on-chip primary storage device having insufficient space to store the entire compression-encoded matrix. Accordingly, the on-chip primary memory device may cooperate with the off-chip secondary memory device to store a portion of the compression-encoded matrix in the on-chip primary storage device to be used as needed, and to load subsequent portions as space becomes available. For example, the on-chip primary memory device may be configured to receive a plurality of rows representing a portion of a compression-encoded matrix (e.g., a plurality of row portions, each representing a portion of a row, and/or a plurality of rows that omits one or more rows/row portions from the compression-encoded matrix). Accordingly, responsive to using (some or all) available data of the portion of the compression-encoded matrix that was loaded into the on-chip primary storage device, the on-chip primary storage device may be configured to load further portions of the compression-encoded matrix from the off-chip secondary storage device onto the on-chip primary storage device.

At 212, method 200 further includes providing decoded input data to a matrix computation module configured to perform a scheduled matrix computation. As described above and as noted at 214, the matrix computation module may be any suitable computational machine, such as a systolic array machine configured to perform matrix multiplications.

At 216, method 200 further includes using compression-encoded data stored in each work memory bank of the encoded input storage device in order to provide the decoded input data. For example, each work memory bank may hold data corresponding to a row/column of an input matrix for a matrix multiplication. The work memory banks may be configured for concurrent access, so that data for multiple rows/columns can be provided concurrently.

At 218, for each work memory bank, providing the decoded data includes reading the compression-encoded input data to find a next defined element. The next defined element is defined in terms of a next defined element value, and a schedule tag. The next defined element value indicates an explicitly-defined matrix value (e.g., a non-zero value for sparsity-encoded matrices, or a boundary value for transition-encoded matrices). The schedule tag indicates when the next explicitly-defined value is needed in the scheduled matrix computation.

At 220, the schedule tag is checked against a scheduling condition. For example, checking the scheduling condition may include maintaining a delay counter indicating a schedule for providing the input values, to be encoded along with the input values. The delay counter may indicate a current step in a scheduled computation, so that an input value may be provided at an appropriate time when the current step matches a corresponding schedule tag for the input value.

At 228, responsive to the schedule tag meeting a scheduling condition (e.g., the schedule tag being equal to the delay counter), the next explicitly-defined element value is provided to the matrix computation module (e.g., by storing the value into a scheduled input buffer). This step occurs, in essence, when the system has determined, via referring to the schedule tag, that it is time for the explicitly-defined element to be provided to the calculation array.

At 222, responsive to the schedule tag not meeting the scheduling condition, instead of providing an explicitly-defined value to the matrix computation module, the default element value is provided to the matrix computation module. At 224, for sparsity-encoded matrices, since the explicitly-defined values are just the non-zero values, the default value is a zero value. At 226, for transition-encoded matrices, since the explicitly-defined values are boundary values, the default value is defined as the previous boundary value. Conversely to step 228, the default value at 222 is provided based on a determination that it is not time for the explicitly-defined element to be provided to the calculation array.

Optionally, at 230, method 200 further includes post-processing results from the matrix computation module, e.g., in an artificial intelligence pipeline as shown in architecture 100' of FIG. 1B.

Optionally, at 232, method 200 further includes saving results of the matrix computation module and/or post-processing to one or more storage devices, e.g., saving to the input storage device such as an off-chip secondary storage device, and/or saving to the encoded input storage device for further processing. Optionally, at 234, method 200 further includes further processing the results with additional matrix computations using the matrix computation module, e.g., to implement an artificial intelligence pipeline using one or more neural network layers implemented via matrix multiplications, such as a DCNN pipeline.

Figure 3:
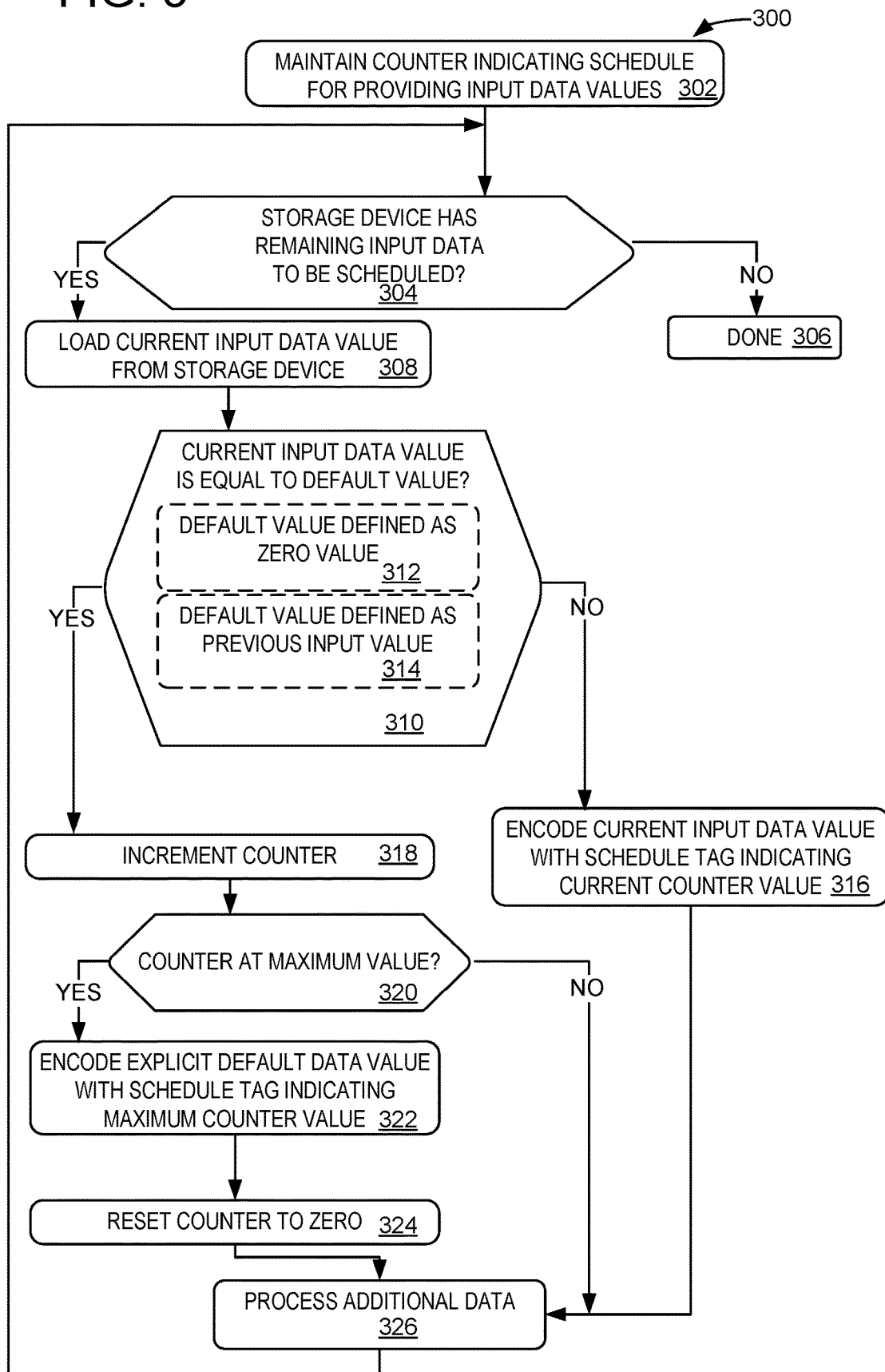
FIG. 3 shows a method of compression-encoding input data.

FIG. 3 shows a method 300 of compression-encoding a raw input matrix to produce a compression-encoded matrix for storage on a compression-encoded input storage device and provision to a scheduled matrix computation. For example, with reference to FIGS. 1A-1B, method 300 may be used by an encoder 116 and/or an encoder 168 to encode matrix data for use in providing scheduled data to a scheduled computation using a decoder 126, and/or for storage in a storage device 110D and/or an encoded input storage device 120S.

At 302, method 300 includes maintaining a delay counter indicating a schedule for providing the input values, to be encoded along with the input values. For example, the delay counter may indicate a current step in a scheduled computation, so that an input value may be provided at an appropriate time when the current step matches a corresponding schedule tag for the input value.

At 304, method 300 includes determining whether the storage device is holding additional remaining input data to be compression encoded for the scheduled computation. If all of the data from the raw input matrix has been scheduled in the compression-encoded matrix, then there is no more input data remaining and, at 306, the encoding process is done.

At 308, if there is remaining data from the raw input matrix to be compression encoded for the scheduled computation, then method 300 further includes, at 308, loading a current input data value from the raw input storage device.

At 310, the current data value is compared against a default value. As noted at 312, for a sparsity-encoding scheme, a default value is defined as a zero value. At 314, for a transition-encoding scheme, the default value is defined as the previous input value. For the transition-encoding scheme, when processing the very first value, there is no defined default value and so the very first value is never equal to the default value.

If the current input value is not equal to the default value, then the current input value needs to be explicitly scheduled for provision in the matrix computation. Accordingly, at 316, the current input data value is encoded along with a corresponding schedule tag indicating the current delay counter value. The current delay counter value thereby represents a schedule at which to provide the current input data value. By storing scheduling tags indicating the schedule for explicitly-defined input data values, the explicitly-defined values can later be decoded (e.g., as described above with regard to method 200), without needing to explicitly store any intervening default values. Instead, the default values can be provided automatically during decoding, anytime a next explicitly-defined value is not yet due according to its corresponding schedule tag.

If the current input data value is equal to the default value, then the current input data value will not be explicitly defined in the compression-encoded matrix. Instead, the delay counter will be manipulated to determine how many default values to provide before providing subsequent explicitly-defined values. Accordingly, at 318, the delay counter is incremented. The incrementing of the delay counter represents the provision of an additional default data value before the next explicitly-defined, scheduled value.

In some examples, the delay counter is stored using a fixed-size data format (e.g., 4-bit integers). Accordingly, at 320, if the delay counter is already at a maximum value for the fixed-size data format, method 300 further includes, at 322, encoding an explicit default data value with a schedule tag indicating the maximum counter value, and resetting the delay counter to zero at 324. By inserting this explicit default data value, the counter can be allowed to "roll over' by being reset to zero, while still keeping track of the number of default values to be provided. The explicitly-defined default values indicate the amount of wait, in terms of number of counter roll-overs, between explicitly-defined values during decoding.

In any case, after either encoding the current input data value at 316, or maintaining the counter at 318, 320, 322, and 324, method 300 further includes processing additional data at 326. Accordingly, the method loops back to 304 to check if the storage device has remaining input data to be scheduled, so as to either process the remaining input data or eventually terminate at 306.

Figure 4A:
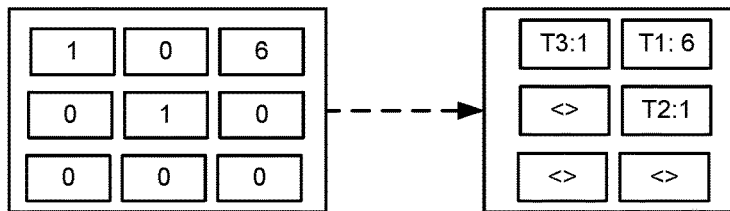
FIG. 4A shows an exemplary sparsity encoding of an input data matrix.

FIGS. 4A-4F illustrate the sparsity-encoding scheme in more detail. FIG. 4A shows sparsity encoding of a 3×3 input matrix, in a raw form to the left of the dashed arrow, and in a sparsity-encoded form to the right of the dashed arrow. Although FIG. 4A shows a 3×3 raw input matrix having as many as two non-zero entries in a row, the techniques disclosed herein can be applied to raw input matrices of any size, having any number of non-zero entries in a row. For large raw input matrices having many zeroes and/or repeated values, compression-encoding techniques may achieve significant compression.

The rows of the input matrix (left side of figure) are encoded as corresponding rows of the sparsity-encoded matrix (right side of figure). In typical examples, the corresponding rows of the sparsity-encoded matrix are stored in work memory banks, e.g., of an encoded-input storage device 116. The "<>" digraphs indicate unused memory that does not correspond to any explicitly-defined value within the rows. The unused memory may be defined in any suitable fashion in memory hardware, e.g., with zero values or pre-defined sentinel values. The rows of the sparsity-encoded matrix also include defined element values and corresponding schedule tags. For example, the sparsity-encoded matrix includes a first row defining an element value 1 with a corresponding scheduling tag T3 (timeslot=3) and an element value 6 with a corresponding scheduling tag T1 (timeslot=1), and a second row defining an element value 1 with a corresponding scheduling tag T2 (timeslot=2). The third row of the sparsity-encoded matrix does not include any defined values, since the third row of the raw input matrix included only zero values.

After compression by the sparsity encoder, the input SRAM includes a plurality of non-zero data values, along with each data value's tagged scheduling information, expressed as a cycle number (e.g., timeslot). In a 16×16 systolic array, the number of cycles required to finish a particular convolution can be as high as 8000 cycles, which requires 13 bits to encode in binary. As the input data are 8-bit values, a total of 21 bits (8-bit input data plus 13-bit cycle number) are typically required. However, in the present disclosure, relative cycle information is instead used. In one embodiment, the longest local range that can be represented using relative cycle information is 4 bits. As a result, a resulting data payload would include an 8-bit data value and 4-bit relative cycle information, using 12 bits in total. In a test case, after doing sparse compression, input data size decreased from 389 KB to 116 KB. It will be understood that 4-bit relative cycle information is used only as an example, and such bit length may be configurable in other embodiments contemplated by this disclosure.

FIGS. 4B-4F show the use of the sparsity-encoded matrix to provide data values for a scheduled matrix computation, e.g., by a decoder 126SC as described with regard to FIGS. 1A-1B. The example decoding process includes maintaining a delay counter. The delay counter is initially set to zero (T=0), and is maintained by incrementing the delay counter after providing decoded input data values. Accordingly, determining whether a corresponding schedule tag for an input value meets a scheduling condition to provide the input value includes checking whether the delay counter matches the corresponding schedule tag.

Figure 4B:
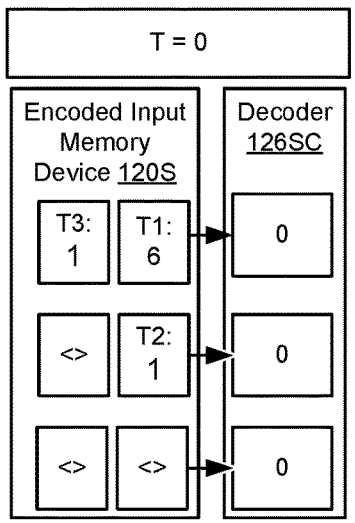
FIGS. 4B-4F show the provision of data values from the sparsity-encoded input matrix in a scheduled computation.

FIG. 4B shows an initial state of a counter T=0 indicating that a scheduled matrix loading has not yet started. FIG. 4B also shows memory contents of an encoded memory device 120S, including a sparsity-encoded matrix with 2 non-zero elements in a first row, 1 non-zero element in a second row, and a third, empty row as described above with regard to FIG. 4A. At T=0, there are not yet any scheduled values to be provided, and a decoder 126SC therefore provides zero values for all three rows of the sparsity-encoded input matrix.

Figure 4C:
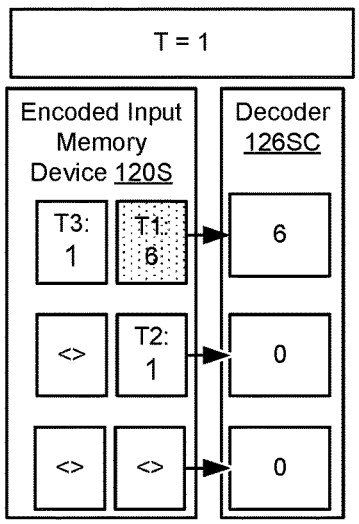

FIG. 4C shows a next time step, T=1. At this time step, the tag T1 for the value 6 in the first row of the sparsity-encoded input matrix indicates that this value is currently scheduled. Accordingly, the decoder provides the value 6 for the first row. The value 6 and corresponding schedule tag are marked as complete (shown with shading) so that subsequent values in the first row can eventually be provided. None of the other values in the sparsity-encoded input matrix are scheduled yet, so the decoder continues to provide zero values for the other rows.

As shown in FIG. 4C, values that have already been processed can be removed from the encoded input storage device 120S and/or marked as complete (as shown for the value 6 in the first row in the figure) so as to process further values in each row at later time steps. In some examples, a pointer may be maintained for each memory bank to indicate how many defined values have been processed for the bank so far (e.g., 1 value processed so far in the first row, and 0 values processed so far in other rows). Then, to process further values, the pointer may be used as an index of the next value to be processed. Alternately or additionally, encoded input storage device 120S may be configured to maintain a collection of just the unused values for each row, and to remove values and corresponding schedule tags when they have been used. For example, encoded input storage device 120S may be implemented as a shift register configured to shift a most recently used value out of storage, while shifting subsequent values to occupy the storage space previously occupied by the most recently used value.

Figure 4D:
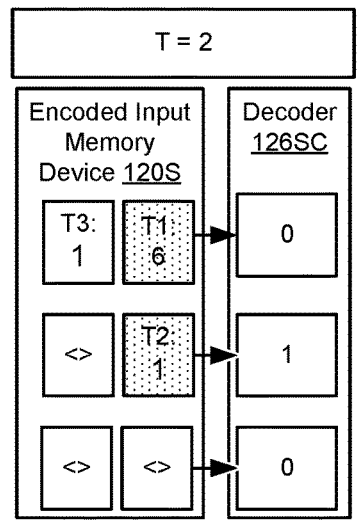

FIG. 4D shows another later time step, T=2. At this time step, the value 1 for the second row is scheduled and provided. There are not yet values scheduled for the first or third rows, so zero values are provided for these rows.

Figure 4E:
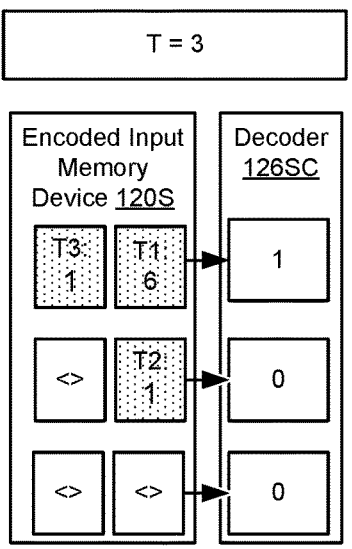

FIG. 4E shows another later time step, T=3. At this time step, the value 1 for the first row is scheduled and provided. There are no values scheduled for the second or third rows, so zero values are provided for these rows. At this point, all of the defined values for each row have been handled and marked complete, so the decoder can provide zero values for any remaining steps in the computation.

Figure 4F:
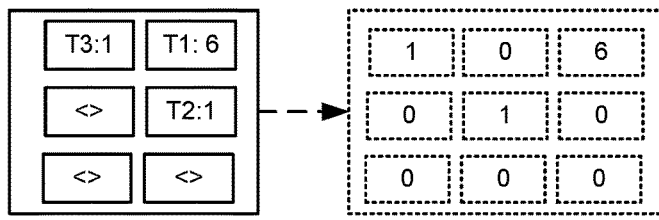

FIG. 4F shows a hypothetical matrix defined by the values provided from time steps T=1 through T=3, with the columns of the matrix being defined, from right-to-left, by the values decoded at each time step. Although FIG. 4F is shown as a fully-defined matrix, it should be appreciated that the fully-defined matrix need not be stored in its fully-defined form in any memory device. Instead, columns of the matrix are provided to the scheduled computation as needed.

FIG. 5A shows a similar example of compression-encoding to FIG. 4A, but using transition encoding instead of sparsity encoding. As shown, the transition encoding scheme includes explicitly-defined, scheduled values for the first (e.g., rightmost) element in each row, as well as each subsequent boundary element representing a transition between different element values. As shown, the first row includes all elements having the value 6, so only a single explicitly-defined element is shown. Similarly, the third row has all elements having the value 3. The second row includes an initial prefix of elements having the value 1, followed by a change to a different boundary element, 2. The transition-encoding scheme can be used to exploit the fact that, in some implementations, the input data is spatially-redundant. For example, images often include spatially similar content.

FIGS. 5B-5F show successive time steps for decoding a transition-encoded input matrix to provide to a scheduled computation, similar to the example shown for a sparsity-encode matrix in FIGS. 4B-4F. As shown, at T=1 in FIG. 5C, the initial (rightmost) values for each row are provided. Then, at subsequent time steps, the same value is provided for each row until an explicitly-defined boundary value is scheduled. When there are no more explicitly-defined boundary values, the same values can be provided for each row until the end of the computation. As shown in FIG. 5F, the transition-encoded input matrix effectively defines a larger, more redundant matrix with the repeated elements that were defined for each row. However, this larger matrix does not need to be stored in memory. Instead, columns can be provided by the decoder one at a time, as they are needed for the scheduled matrix computation.

Although FIGS. 4A-4F and 5A-5F show 3×3 matrices, the techniques disclosed herein may be used for matrices of any size, e.g., rectangular or square matrices having 10 s, 100 s, 1000 s, or even more rows and/or columns. Due to the approach described herein, the decoder and scheduled matrix computation module can operate directly on the compressed data by unpacking the compression-encoded data as needed. Accordingly, there is no need for a separate decompression/decoding step. Because the sparse data is cached in the local buffers, it is not necessary to read data from memory during cycles where cached data is provided to the systolic array. This reduces energy expenditure (e.g., expenditure from repeated SRAM reads).

In some examples, encoders/decoders may be configured to use only sparsity encoding or transition encoding. In other examples, encoders/decoders may be configured to switch between sparsity encoding and transition encoding. For example, a plurality of scheduled matrix computations may include a plurality of scheduled matrix computations using sparsity-encoded matrices and a plurality of scheduled matrix computations using transition-encoded matrices. In some examples, for a given computation, raw input data may be alternately encoded in both sparsity-encoded and transition-encoded forms and memory/power consumption may be tested empirically for a portion of the computation, in order to determine whether to use sparsity encoding or transition encoding to reduce memory and/or power consumption.

In examples where multiple layers of matrix computations are performed in a loop (e.g., in an artificial intelligence architecture such as architecture 100' shown in FIG. 1B), sparsity encoding may be used for some layers of computation while transition encoding is used for other layers of computation. For example, transition encoding may be particularly efficient for processing inputs to a DCNN computation when the inputs include image data having spatial redundancy. Similarly, sparsity encoding may be particularly efficient for processing intermediate layers of a DCNN computation when the DCNN layers result in sparse data (e.g., due to element-wise processing with ReLU activation function, which may induce sparsity). Accordingly, in some examples, the compression-encoded matrix is either a sparsity-encoded matrix or a transition-encoded matrix. When the compression-encoded matrix is a sparsity-encoded matrix, the plurality of defined element values for a row includes a plurality of non-zero element values in the row, and providing the default element value includes providing a zero value. When the compression-encoded matrix is a transition-encoded matrix, the plurality of defined element values for a row includes a plurality of boundary element values in a row, the plurality of boundary element values define transitions between different element values in the row, and providing the default element value includes providing a most recent boundary element value in the row.

In addition to reducing memory accesses, latency, and residency (thereby decreasing power consumption), the compression-encoding schemes described herein may enable further opportunities to reduce leakage power in memory devices (e.g., SRAM). The compression-encoding schemes allow the precise identification of when memory will next be accessed, which allows proactively setting memory devices in appropriate power-saving modes, as well as proactively waking the memory devices from power-saving modes to minimize wake-up latency. Accordingly, the encoded input storage device may be configured to recognize when different power-saving modes can be applied to save power, based on the compression encoded input data (e.g., based on schedule tags for defined elements in the compression encoded input data).

For example, when the encoded input storage device is an SRAM device, significant power consumption may occur from leakage energy when the SRAM device is in an active mode. Although the present example is described with regard to SRAM, power-saving modes and proactive wakeup may be used with any other memory technology having similar energy-saving modes. Accordingly, the SRAM device may be placed into a lower-energy mode with reduced power consumption. For example, SRAM devices may support, in addition to active modes, a first reduced-power "snooze" mode and a second, further reduced-power "deep sleep" mode. The "deep sleep" mode typically incurs data loss. For an SRAM encoded-input storage device including a plurality of banks, each bank may be put into an independent mode.

The compression encoding methods of the present disclosure may enable reduced SRAM power, via "snooze" mode, without incurring any additional latency due to switching SRAM modes. According to the present disclosure, data from an SRAM bank is read at a pre-defined schedule. For example, when a next defined element value for a given SRAM bank has a corresponding schedule tag indicating a future point in the computation, no other values need to be read from that SRAM bank until that future point when the schedule tag meets a scheduling condition. Accordingly, since the next defined element value for a bank has a corresponding schedule tag that indicates the next defined element value is scheduled for a defined number of cycles in the future, the bank may be put into snooze mode, thereby reducing power, until just before the next defined element value is needed. Then, the bank may be pre-emptively returned to active mode from snooze mode at an appropriate time (e.g., at a time defined by the defined number of cycles in the future, adjusted to account for latency to return to active mode from snooze mode) so that the bank is available for memory access exactly as the next defined element value is due for provision.

As described above, based on recognizing a memory bank will not be accessed during a portion of the scheduled matrix computation, the memory bank can be pre-emptively put in a reduced-power, snooze state, and then proactively returned to the active state. By recognizing when the memory bank will be accessed during a subsequent portion of the scheduled matrix computation, the memory bank can be pre-emptively awakened from the snooze state to a wake state. By returning the bank to active mode, proactively at the appropriate time, the power savings of snooze mode can be obtained while masking latency to switch from snooze mode back to active mode. For some matrix computations, it may be frequently be the case that one or more memory banks are not accessed for at least a portion of the matrix computation. Accordingly, pre-emptively putting memory banks in the reduced-power, snooze state may achieve substantial power savings.

Additionally, the reduced memory residency requirements from the compression-encoding scheme may enable all of the data for a scheduled matrix computation to be stored in a smaller subset of the available memory banks, so that some of the memory banks may be put into a lowest-power, deep sleep mode. Accordingly, the encoded-input storage device may be configured to recognize when data can be consolidated, in order to put unused work memory banks into deep sleep. For example, portions of each memory bank could be designated to each of two different rows of the raw input matrix, and then populated with compression-encoded data for the two rows. Based on recognizing that the plurality of rows may be stored by a reduced subset of work memory banks of the plurality of work memory banks, an unused subset of work memory banks may be freed. Then, after consolidating compression-encoded matrix data into the reduced subset of work memory banks, the unused subset of work memory banks may be put in a reduced-power, deep sleep state.

As discussed above, use of the herein-described sparsity encoder can provide numerous advantages. When the input data is sparse (i.e., includes many zeroes), the sparsity-encoder decreases the overall amount of data loaded into the input SRAM by discarding zeroes. In typical scenarios, the size of the input SRAM is chosen such that it fits the entire input dataset to avoid having to expend energy copying data to other memory devices. By reducing the overall input data as described herein, the size of the input SRAM can be reduced, resulting in reduced area and reduced power leakage. When the data has redundancy, it can be efficiently transition-encoded on the basis of data changes rather than zeroes. For example, in the case of images, many data values will have spatial redundancy, meaning a series of identical data values only requires a single representative value to be loaded. Use of such an encoding scheme may result in higher compression and further energy savings as compared to the zero-encoding scheme described above.

As the size of the input data loaded into input SRAM is reduced, the amount of bandwidth used to transfer the data is also reduced, resulting in reduced power consumption in communication and memory access. This is particularly evident in implementations in which the size of input SRAM is limited, meaning at least some input data is stored in other memory devices that may have higher energy costs for access.

Furthermore, as discussed above, the control logic works directly on the compression-encoded data without requiring a dedicated decompression step that returns the data to its original format. This allows for reduced SRAM memory size. Furthermore, because data is cached in the local buffers before delivery to the systolic array, the number of SRAM reads can be reduced, as zeroes can be provided to the systolic array any time the next cached data value has a tagged cycle value that does not match the current systolic array cycle. In the case where 4-bit relative cycle information is used, SRAM access can be reduced by 70% in some test scenarios.

Because the control logic caches encoded data in local buffers along with tagged cycle information, each required SRAM access can be predicted ahead of time. Thus, some number of SRAM devices can be placed in data retention mode by reducing the voltage, which in turn would reduce power consumption of such devices by 50% or more.

Furthermore, the input payload capacity of each layer can be used to pre-determine what percentage of the SRAM will be used. For example, in a given deep neural network layer calculation, not all SRAM banks will necessarily be used, meaning unused banks can be powered down completely. SRAM size is typically set such that the SRAM can hold all data required for the largest single layer calculation. As a result, it is highly probable that the entire storage capacity of the SRAM will not be used for every layer calculation, as there is typically some input size variance between each layer.

Although the encoder and decoder may consume additional electrical power as compared to systems that do not benefit from the herein-described techniques, it is believed that the resource costs associated with the sparse encoder and modified control logic are negligible compared to the energy savings. It is believed that for some applications (e.g., DCNN implementations), the overall dynamic energy consumed by the system may be reduced by 30%, while the energy consumed by the SRAM alone may be reduced by more than 50%.

In some embodiments, the methods and processes described herein may be tied to a computing system of one or more computing devices. In particular, such methods and processes may be implemented as a computer-application program or service, an application-programming interface (API), a library, and/or other computer-program product.

Figure 6:
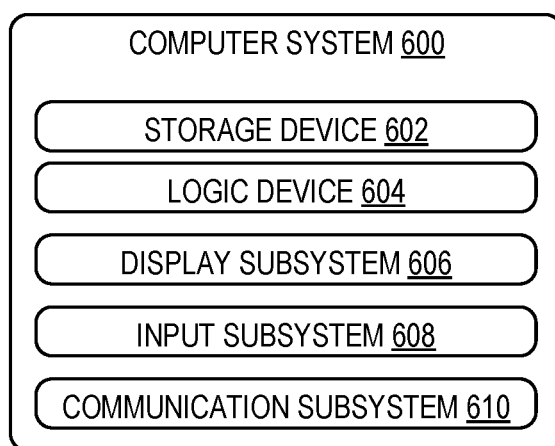
FIG. 6 shows an exemplary computing system.

FIG. 6 schematically shows a non-limiting embodiment of a computing system 600 that can enact one or more of the methods and processes described above. Computing system 600 is shown in simplified form. Computing system 600 may take the form of one or more personal computers, server computers, tablet computers, home-entertainment computers, network computing devices, gaming devices, mobile computing devices, mobile communication devices (e.g., smart phone), and/or other computing devices.

Computing system 600 includes a logic machine 602 and a storage machine 604. Computing system 600 may optionally include a display subsystem 606, input subsystem 608, communication subsystem 610, and/or other components not shown in FIG. 6.

Logic machine 602 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. In some examples, processors of the logic machine may be arranged in a systolic array configured to perform a scheduled computation in which input data is processed substantially in parallel according to a schedule. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 604 includes one or more physical devices configured to hold instructions executable by the logic machine to implement the methods and processes described herein. When such methods and processes are implemented, the state of storage machine 604 may be transformed—e.g., to hold different data.

Storage machine 604 may include removable and/or built-in devices. Storage machine 604 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 604 may include volatile, nonvolatile, dynamic, static, read/write, read-only, random-access, sequential-access, location-addressable, file-addressable, and/or content-addressable devices.

It will be appreciated that storage machine 604 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 602 and storage machine 604 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 600 implemented to perform a particular function. In some cases, a module, program, or engine may be instantiated via logic machine 602 executing instructions held by storage machine 604. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 606 may be used to present a visual representation of data held by storage machine 604. This visual representation may take the form of a graphical user interface (GUI). As the herein described methods and processes change the data held by the storage machine, and thus transform the state of the storage machine, the state of display subsystem 606 may likewise be transformed to visually represent changes in the underlying data. Display subsystem 606 may include one or more display devices utilizing virtually any type of technology. Such display devices may be combined with logic machine 602 and/or storage machine 604 in a shared enclosure, or such display devices may be peripheral display devices.

When included, input subsystem 608 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 610 may be configured to communicatively couple computing system 600 with one or more other computing devices. Communication subsystem 610 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system 600 to send and/or receive messages to and/or from other devices via a network such as the Internet.

In an example, a method of performing matrix computations comprises: receiving a compression-encoded matrix including a plurality of rows, each row having a plurality of defined element values and, for each such defined element value, a schedule tag indicating a schedule for using the defined element value in a scheduled matrix computation; loading the plurality of rows of the compression-encoded matrix into a corresponding plurality of work memory banks; and providing decoded input data to a matrix computation module configured for performing the scheduled matrix computation, wherein providing the decoded input data includes, for each work memory bank: reading a next defined element value and a corresponding schedule tag; responsive to the corresponding schedule tag meeting a scheduling condition, providing the next defined element value to the matrix computation module; and responsive to the corresponding schedule tag not meeting the scheduling condition, providing a default element value to the matrix computation module. In this or any other example, the matrix computation module includes a systolic array module. In this or any other example, the scheduled matrix computation is a matrix multiplication computation to compute a matrix product of the compression-encoded matrix and a second compression-encoded matrix, and wherein the systolic array module implements the scheduled matrix computation via a plurality of multiply-and-accumulate computational nodes. In this or any other example, the compression-encoded matrix is provided to the plurality of work memory banks by an encoder, responsive to receiving, at the encoder, raw input data from an off-chip secondary storage device. In this or any other example: the compression-encoded matrix is a sparsity-encoded matrix; the plurality of defined element values for a row includes a plurality of non-zero element values in the row; and providing the default element value includes providing a zero value. In this or any other example, the compression-encoded matrix is a transition-encoded matrix; the plurality of defined element values for a row includes a plurality of boundary element values in a row, the plurality of boundary element values defining transitions between different element values in the row; and providing the default element value includes providing a most recent boundary element value in the row. In this or any other example, the method further comprises recognizing a memory bank of the plurality of memory banks will not be accessed during a portion of the scheduled matrix computation, and putting the memory bank in a reduced-power, snooze state, wherein such recognition includes reading the next defined element value for the memory bank and the corresponding schedule tag, and determining that the corresponding schedule tag indicates the next defined element value is scheduled for a defined number of cycles in the future. In this or any other example, the method further comprises recognizing that the memory bank will be accessed during a subsequent portion of the scheduled matrix computation occurring the defined number of cycles in the future, and pre-emptively awakening the memory bank from the snooze state to a wake state. In this or any other example, the method further comprises: recognizing that the plurality of rows may be stored by a reduced subset of work memory banks of the plurality of work memory banks, thereby freeing an unused subset of work memory banks; consolidating compression-encoded matrix data into the reduced subset of work memory banks; and putting the unused subset of work memory banks in a reduced-power, deep sleep state. In this or any other example, the method further comprises: compression-encoding a result of the scheduled matrix computation as a compression-encoded result matrix including a plurality of result rows, each result row having a plurality of defined result element values and, for each such defined result element value, a result schedule tag indicating a schedule for using the defined result element value in a future scheduled matrix computation, and storing the compression-encoded result matrix on a storage device. In this or any other example, the method further comprises: compression-encoding a result of the scheduled matrix computation and using the result in subsequent scheduled matrix computations. In this or any other example, the subsequent scheduled matrix computations define layers of a neural network computation. In this or any other example, the receiving of a compression-encoded matrix, loading of a plurality of rows, and providing of decoded input data are performed repeatedly for a plurality of compression-encoded matrices. In this or any other example, when the compression-encoded matrix is a sparsity-encoded matrix, the plurality of defined element values for a row includes a plurality of non-zero element values in the row, and providing the default element value includes providing a zero value; and when the compression-encoded matrix is a transition-encoded matrix, the plurality of defined element values for a row includes a plurality of boundary element values in a row, the plurality of boundary element values define transitions between different element values in the row, and providing the default element value includes providing a most recent boundary element value in the row. In this or any other example, the method further comprises: maintaining a delay counter by incrementing the delay counter after providing decoded input data values, wherein determining whether the corresponding schedule tag meets the scheduling condition includes checking whether the delay counter matches the corresponding schedule tag.

In an example, a computer system for performing matrix computations comprises: an encoded-input storage device including a plurality of memory banks, the encoded-input storage device configured to: receive a compression-encoded matrix including a plurality of rows, each row having a plurality of defined element values and, for each such defined element value, a schedule tag indicating a schedule for using the defined element value in a scheduled matrix computation; and load each row the plurality of rows of the compression-encoded matrix into a corresponding work memory bank of the plurality of memory banks; and a decoder configured to provide decoded input data to a matrix computation module configured for performing the scheduled matrix computation, wherein providing the decoded input data includes, for each work memory bank: reading a next defined element value and a corresponding schedule tag; responsive to the corresponding schedule tag meeting a scheduling condition, providing the next defined element value to the matrix computation module; and responsive to the corresponding schedule tag not meeting the scheduling condition, providing a default element value to the matrix computation module. In this or any other example, the decoder is further configured to maintain a delay counter by incrementing the delay counter after providing decoded input data values; and determining whether the corresponding schedule tag meets the scheduling condition In this or any other example, the encoded-input storage device is further configured to: recognize a memory bank of the plurality of memory banks will not be accessed during a portion of the scheduled matrix computation, wherein such recognition includes reading the next defined element value for the memory bank and the corresponding schedule tag, and determining that the corresponding schedule tag indicates the next defined element value is scheduled for a defined number of cycles in the future; put the memory bank in a reduced-power, snooze state; recognize that the memory bank will be accessed during a subsequent portion of the scheduled matrix computation occurring the defined number of cycles in the future; and pre-emptively awakening the memory bank from the snooze state to a wake state. In this or any other example, the encoded-input storage device is further configured to: recognize that the plurality of rows may be stored by a reduced subset of work memory banks of the plurality of work memory banks, thereby freeing an unused subset of work memory banks; consolidate compression-encoded matrix data into the reduced subset of work memory banks; and put the unused subset of work memory banks in a reduced-power, deep sleep state.

In an example, a method of performing matrix computations comprises: receiving a compression-encoded matrix including a plurality of rows, each row having a plurality of defined element values and, for each such defined element value, a schedule tag indicating a schedule for using the defined element value in a scheduled matrix computation; loading the plurality of rows of the compression-encoded matrix into a corresponding plurality of work memory banks; and providing decoded input data to a systolic array configured for performing the scheduled matrix computation, wherein providing the decoded input data includes: maintaining a counter indicating current progress in the scheduled matrix computation; and for each work memory bank: reading a next defined element value and a corresponding schedule tag; responsive to the counter matching the schedule tag, providing the next defined element value to the systolic array; responsive to the counter not matching the tag, providing a default element value to the systolic array; and advancing the counter.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method of performing matrix computations, comprising:
   receiving a compression-encoded matrix including a plurality of rows, each row having a plurality of defined element values and, for each such defined element value, a schedule tag indicating a schedule for using the defined element value in a scheduled matrix computation;
   loading the plurality of rows of the compression-encoded matrix into a corresponding plurality of work memory banks as input data, wherein the plurality of rows remain in a compressed encoding when loaded into the corresponding plurality of work memory banks; and
   providing the input data in the compressed encoding to a matrix computation module configured for performing the scheduled matrix computation on the input data in the compressed encoding, wherein the input data in the compressed encoding is provided to the matrix computation module one data value at a time as needed by the matrix computation module without decompressing the compression-encoded matrix.

2. The method of claim 1, wherein providing the input data in the compressed encoding includes, for each work memory bank:
   reading a next defined element value and a corresponding schedule tag;
   responsive to the corresponding schedule tag meeting a scheduling condition, providing the next defined element value to the matrix computation module; and
   responsive to the corresponding schedule tag not meeting the scheduling condition, providing a default element value to the matrix computation module.

3. The method of claim 1, wherein the scheduled matrix computation is a matrix multiplication computation to compute a matrix product of the compression-encoded matrix and a second compression-encoded matrix, and wherein the matrix computation module includes a systolic array module that implements the scheduled matrix computation via a plurality of multiply-and-accumulate computational nodes.

4. The method of claim 1, wherein the compression-encoded matrix includes a plurality of repeated data elements.

5. The method of claim 1, wherein:
   the compression-encoded matrix is a sparsity-encoded matrix;
   the plurality of defined element values for a row includes a plurality of non-zero element values in the row; and
   providing the default element value includes providing a zero value.

6. The method of claim 1, wherein:
   the compression-encoded matrix is a transition-encoded matrix;
   the plurality of defined element values for a row includes a plurality of boundary element values in a row, the plurality of boundary element values defining transitions between different element values in the row; and
   providing the default element value includes providing a most recent boundary element value in the row.

7. The method of claim 1, further comprising recognizing a memory bank of the plurality of memory banks will not be accessed during a portion of the scheduled matrix computation, and putting the memory bank in a reduced-power, snooze state, wherein such recognition includes reading the next defined element value for the memory bank and the corresponding schedule tag, and determining that the corresponding schedule tag indicates the next defined element value is scheduled for a defined number of cycles in the future.

8. The method of claim 7, further comprising recognizing that the memory bank will be accessed during a subsequent portion of the scheduled matrix computation occurring the defined number of cycles in the future, and pre-emptively awakening the memory bank from the snooze state to a wake state.

9. The method of claim 1, further comprising:
recognizing that the plurality of rows may be stored by a reduced subset of work memory banks of the plurality of work memory banks, thereby freeing an unused subset of work memory banks;
consolidating compression-encoded matrix data into the reduced subset of work memory banks; and
putting the unused subset of work memory banks in a reduced-power, deep sleep state.

10. The method of claim 1, further comprising compression-encoding a result of the scheduled matrix computation as a compression-encoded result matrix including a plurality of result rows, each result row having a plurality of defined result element values and, for each such defined result element value, a result schedule tag indicating a schedule for using the defined result element value in a future scheduled matrix computation, and storing the compression-encoded result matrix on a storage device.

11. The method of claim 1, further comprising compression-encoding a result of the scheduled matrix computation and using the result in subsequent scheduled matrix computations.

12. The method of claim 11, wherein the subsequent scheduled matrix computations define layers of a neural network computation.

13. The method of claim 1, wherein the receiving of a compression-encoded matrix, loading of a plurality of rows, and providing of decoded input data are performed repeatedly for a plurality of compression-encoded matrices.

14. The method of claim 13, wherein:
when the compression-encoded matrix is a sparsity-encoded matrix, the plurality of defined element values for a row includes a plurality of non-zero element values in the row, and providing the default element value includes providing a zero value; and
when the compression-encoded matrix is a transition-encoded matrix, the plurality of defined element values for a row includes a plurality of boundary element values in a row, the plurality of boundary element values define transitions between different element values in the row, and providing the default element value includes providing a most recent boundary element value in the row.

15. The method of claim 1, further comprising maintaining a delay counter by incrementing the delay counter after providing decoded input data values, wherein determining whether the corresponding schedule tag meets the scheduling condition includes checking whether the delay counter matches the corresponding schedule tag.

16. A computer system for performing matrix computations, comprising:
a logic machine configured to:
encode matrix data as a compression-encoded matrix including a plurality of rows in a compressed encoding, each row having a plurality of defined element values and, for each such defined element value, a schedule tag indicating a schedule for using the defined element value in a scheduled matrix computation when a scheduling condition for the schedule tag is met and using a default element value in the scheduled matrix computation when the scheduling condition for the schedule tag is not met; and
provide the plurality of rows of the compression-encoded matrix to a plurality of matrix computation work memory banks of an encoded input storage device.

17. The computer system of claim 16, further comprising a matrix computation module configured to perform the scheduled matrix computation directly on the compression-encoded matrix in the compressed encoding, without decompressing the compression-encoded matrix.

18. The computer system of claim 17, wherein the matrix computation module is configured to:
load a next defined element value and a corresponding schedule tag from the compression-encoded matrix;
responsive to the corresponding scheduling tag meeting a scheduling condition, operate on the next defined element value;
responsive to the corresponding scheduling tag not meeting the scheduling condition, operate on a default element value and defer operating on the next defined element value.

19. The computer system of claim 16, wherein the encoded-input storage device is further configured to:
recognize that the plurality of rows may be stored by a reduced subset of work memory banks of the plurality of work memory banks, thereby freeing an unused subset of work memory banks;
consolidate compression-encoded matrix data into the reduced subset of work memory banks; and
put the unused subset of work memory banks in a reduced-power, deep sleep state.

20. A method of performing matrix computations on a computing system, the method comprising:
at a logic machine of the computing system, encoding matrix data as a compression-encoded matrix including a plurality of rows, each row having a plurality of defined element values and, for each such defined element value, a schedule tag indicating a schedule for using the defined element value in a scheduled matrix computation when a scheduling condition for the schedule tag is met and using a default element value in the scheduled matrix computation when the scheduling condition for the schedule tag is not met;
at a matrix computation module of the computing system, performing the scheduled matrix computation on the compression-encoded matrix without decompressing the matrix data from the compression-encoded matrix, including:
maintaining a counter indicating current progress in the scheduled matrix computation; and
for each row of the compression encoded matrix:
reading a next defined element value and a corresponding schedule tag;
responsive to the counter matching the schedule tag, operating on the next defined element value;
responsive to the counter not matching the tag, operating on a default element value; and
advancing the counter.

* * * * *